(12) United States Patent
Gsellmann

(10) Patent No.: US 6,524,710 B1
(45) Date of Patent: Feb. 25, 2003

(54) METHOD FOR PRODUCING INSULATING TAPES CONTAINING MICA, AND THE UTILIZATION THEREOF

(75) Inventor: Helmut Gsellmann, Graz (AT)

(73) Assignee: ISOVOLTA- Osterreichische Isolierstoffwerke Aktiengesellschaft, Wiener Neudorf (AT)

( * ) Notice: Subject to any disclaimer, the term of this patent is extended or adjusted under 35 U.S.C. 154(b) by 0 days.

(21) Appl. No.: 09/581,659

(22) PCT Filed: Oct. 13, 1999

(86) PCT No.: PCT/EP98/07669

§ 371 (c)(1),
(2), (4) Date: Aug. 8, 2000

(87) PCT Pub. No.: WO00/24007

PCT Pub. Date: Apr. 27, 2000

(30) Foreign Application Priority Data

Oct. 16, 1998 (EP) .............................................. 98890304

(51) Int. Cl.$^7$ ............................................... B32B 27/38
(52) U.S. Cl. ....................................... 428/414; 156/283
(58) Field of Search ........................... 156/283; 428/414

(56) References Cited

U.S. PATENT DOCUMENTS

| 3,214,324 A | * | 10/1965 | Peerman ..................... 156/283 |
| 3,254,150 A | * | 5/1966 | Rogers ....................... 428/414 |
| 4,418,241 A | | 11/1983 | Fujiwara |
| 6,103,382 A | * | 8/2000 | Smith et al. ................. 428/414 |

FOREIGN PATENT DOCUMENTS

| DE | 1745545 | | 10/1969 |
| DE | 2151753 | | 4/1972 |
| EP | 0194974 | A1 | 9/1986 |
| FR | 1481938 | | 5/1967 |
| FR | 2013311 | | 3/1970 |
| FR | 2095942 | | 11/1972 |
| JP | 53-96500 | * | 8/1978 ................. 428/414 |

OTHER PUBLICATIONS

Database WPI—Abstract for JP 11 234934 A (Aug. 27, 1999).
Database WPI—Abstract for JP 59 223400 (Dec. 15, 1984).
Database WPI—Abstract for JP 57 126006 (Aug. 5, 1982).

* cited by examiner

Primary Examiner—John J. Gallagher
(74) Attorney, Agent, or Firm—Young & Thompson

(57) ABSTRACT

A process for producing mica-containing insulating tape for windings of rotating high voltage electrical machinery which after winding under a vacuum and pressure can be impregnated with a solvent-free synthetic resin and then cured under the action of heat, a fiber-containing mica film which in addition to fine mica also has organic and/or inorganic fibers being sprinkled with an epoxy resin mixture in the form of a powder enamel and the side of the fiber-containing mica film which has been sprinkled with the powder enamel being cemented under pressure and at an elevated temperature to a carrier material.

10 Claims, 1 Drawing Sheet

Figure 1:
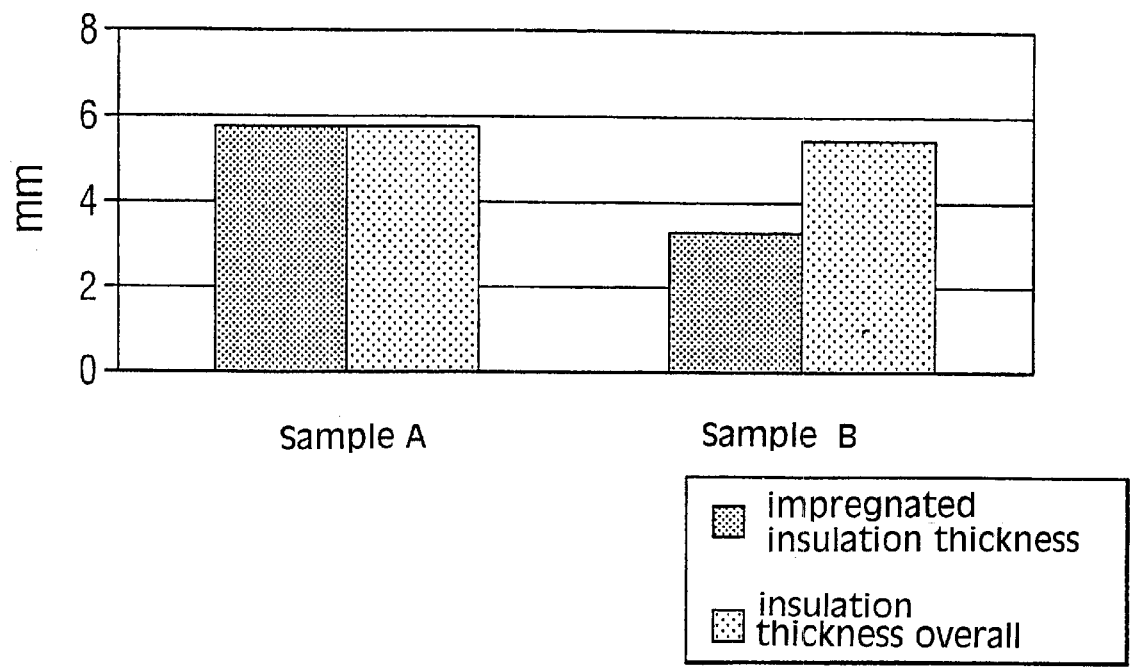

METHOD FOR PRODUCING INSULATING TAPES CONTAINING MICA, AND THE UTILIZATION THEREOF

The invention relates to a process for producing mica-containing insulating tape for winding elements of rotating high voltage electrical machinery which after winding under a vacuum and pressure can be impregnated with a solvent-free synthetic resin and then cured under the action of heat, and their use in the main insulation of rotating high voltage electrical machines.

PRIOR ART

To insulate winding elements in rotating high voltage electrical machines the impregnation technique based on vacuum pressure impregnation has become very popular in recent years. In doing so the winding elements for construction engineering reasons are made either as preformed coils or conductor bars, preferably Roebel bars. These winding elements are provided with mica-containing main insulation and are further treated in a vacuum pressure impregnation process. Here epoxy resins, preferably low-viscosity solvent-free resin systems, are used as the impregnation resins.

At this point they impregnate in a vacuum and under pressure the mica-containing main insulation formed from several winding layers so that cavities which can cause partial discharges between the winding layers are completely filled so that after curing of the impregnation resin an electrically and mechanically stable insulating sleeve is formed.

The winding layers of the main insulation are formed by mica-containing insulating tapes. They are produced such that a mica film is cemented to a porous carrier material using a binder. This porous mica-containing insulating tape is designed to absorb the aforementioned impregnation resin under a vacuum and pressure to the greatest possible extent.

Mainly in generator construction in recent years has the demand grown for mica-containing insulating tapes which are to have not only good workability on modern winding machines, but also satisfactory impregnation capacity since due to the increasing size and power of generators likewise high insulating wall thicknesses have become necessary.

Known insulating tapes can only partially meet this requirement since they act rather as barriers due to their physical and chemical composition relative to the penetrating impregnation resin so that at longer impregnation times the impregnation depth, i.e. the number of impregnated winding layers, is insufficient for high insulating wall thicknesses.

DESCRIPTION OF THE INVENTION

The object of this invention is therefore to devise a mica-containing insulating tape of the initially mentioned type which in addition to very good winding properties on modern automatic winding machines also exhibits much improved impregnation behavior during vacuum pressure impregnation. In addition, this mica-containing insulating tape should be easy to produce and stable in storage.

Therefore, by the invention it is proposed that this mica-containing insulating tape be produced such that a fiber-containing mica film which in addition to fine mica also has organic and/or inorganic fibers is sprinkled with an epoxy resin mixture in the form of a powder enamel and that the side of the fiber-containing mica film which has been sprinkled with the powder enamel is cemented under pressure and at an elevated temperature to a carrier material.

Preferably this carrier material consists of a glass fabric, a fabric or a plastic film.

Introducing fibers into the mica film makes the latter more porous so that its capillary action is increased relative to the impregnation resin during vacuum pressure impregnation. The resulting advantages are shorter impregnation times and impregnation with more highly viscous resins to be able to impregnate also very high insulating wall thicknesses entirely with impregnation resin.

Furthermore, preferably a fiber content is chosen which is between at least 3 and a maximum 50% by weight relative to 100% by weight fiber-containing mica film. A proportion of fiber less than 3% by weight does not contribute to improvement of the impregnation capacity; a proportion of fiber exceeding 50% by weight even reduces the dielectric strength of the mica-containing insulating tape.

Other advantages of the invention consist in that the organic and/or inorganic fibers in the fiber-confining mica film have an average diameter from 0.1 to 20 microns and an average length from 0.5 to 10 mm.

Furthermore, according to the invention the organic fibers are chosen from the group of aromatic polyamides or aromatic polyesters such as polyethylene terephthalate and the inorganic fibers are chosen from the group of E-glass, S-glass, silicon glass and aluminum.

According to another version of the process as claimed in the invention the fiber-confining mica film has a curing accelerator, preferably zinc naphthenate, which acts on the solvent-free synthetic resin.

In addition, the powdered epoxy resin mixture can contain a curing agent, preferably an amine curing agent.

According to the process of the invention the epoxy resin mixture which is used in the form of a powder enamel has a softening point exceeding 85° C.

The invention furthermore relates to use of a mica-containing insulating tape which was produced according to the aforementioned process versions as the main insulation in rotating high voltage electrical machines, the mica-containing insulating tape being wound in several layers around a winding element and then impregnated under a vacuum and pressure with a solvent-free synthetic resin.

Furthermore, in the aforementioned vacuum pressure impregnation preferably solvent-free synthetic resins such as for example epoxy acid anhydride mixtures based on bisphenol-A or bisphenol-F are used.

Epoxy resin acid anhydride systems are usually heated to 60–70° C. to have viscosity low enough for the impregnation process. Mica-containing insulating tapes which have been produced according to the process as claimed in the invention can however be satisfactorily impregnated at a much higher resin viscosity and are therefore especially well suited for impregnation with resins which can only be heated to roughly 30° C. and therefore have a mostly very high impregnation viscosity, for example polyester resins with styrene or vinyl alcohol as the monomer.

ONE EMBODIMENT OF THE INVENTION

Figure 2:
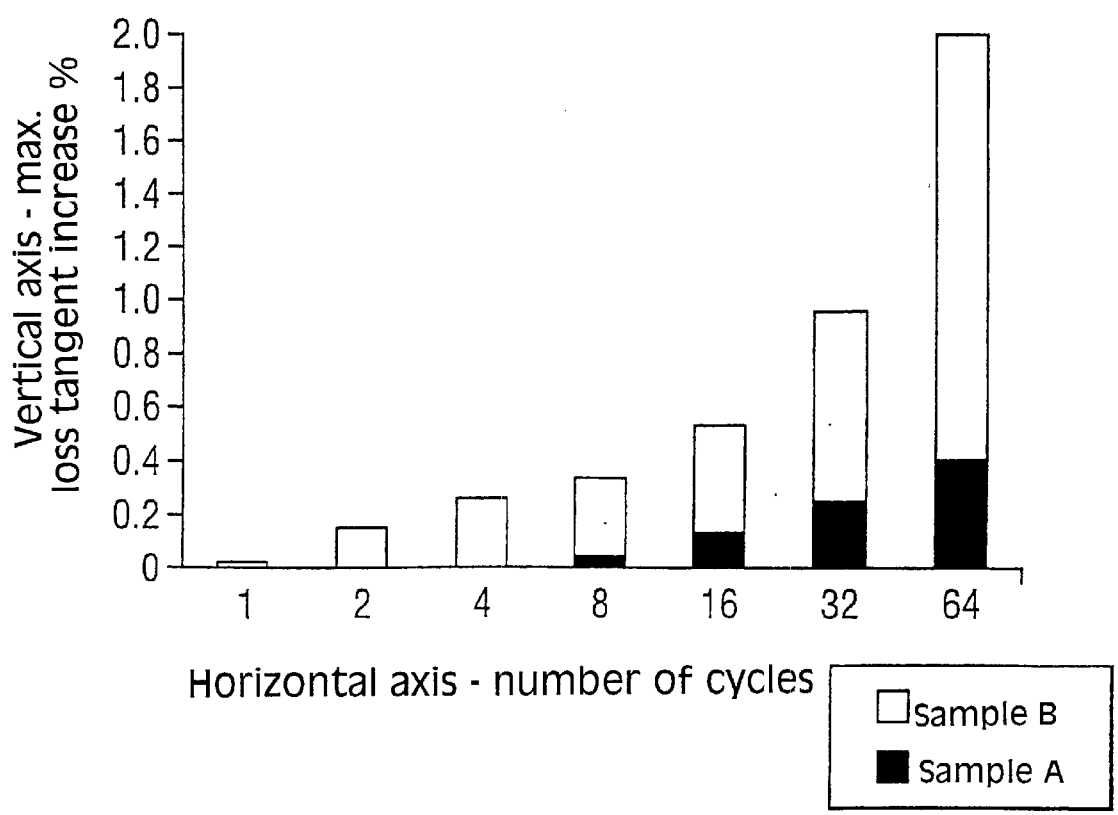

The invention is detailed using the embodiments and the diagrams prepared using the embodiments as shown in FIGS. 1 and 2.

EXAMPLE 1

A fiber-containing mica film with a weight of 160 g/m² consisting of a mixture of uncalcined muscovite or phlogopite and 5% by weight alkali-free E-glass short fibers which have a diameter of on average 8 microns and a fiber length of roughly 3 mm is impregnated with a solution of zinc naphthenate in methylethyl ketone and the solvent is evaporated. The fiber-containing mica film which has been pre-impregnated with roughly 4 g/m$^2$ zinc naphthenate is sprinkled with a powdered epoxy resin mixture with a softening point of $\geq 85°$ C. and by means of a heatable calender under pressure and the action of heat is cemented to the carrier material. To achieve especially satisfactory impregnation values during vacuum pressure impregnation a curing agent, preferably an amine curing agent, can be added to the epoxy resin mixture.

The following can be used as the carrier material:
a) a glass fabric with a mass per unit area of 23 g/m$^2$ which is coated with 2 g/m$^2$ of a flexibly cross-linking acrylic resin and then is temperature-treated in an oven at 100° C. to cure the acrylic resin, or
b) a glass fabric with a mass per unit area of 23 g/m$^2$ which is coated with 0.5 g/m$^2$ zinc naphthenate, or
c) a polyester fabric with a mass per unit area of 20 g/m$^2$, or
d) a polyester film with a mass per unit area of 42 g/m$^2$.

EXAMPLE 2

A fiber-containing mica film with a weight of 160 g/m$^2$ consisting of a mixture of uncalcined muscovite or phlogopite and 5% by weight alkali-free E-glass short fibers which have a diameter of on average 8 microns and a fiber length of roughly 3 mm is preimpregnated with a solution of an epoxy resin mixture in methylethyl ketone. After the solvent is evaporated, roughly 4 g/m$^2$ epoxy resin remain in the fiber-containing mica film. This measure prevents detachment of the mica flakes during subsequent processing so that the fiber-containing mica film is more resistant to mechanical loading.

The mica film which has been preimpregnated in this way is sprinkled with a powdered epoxy resin mixture with a softening point of $\geq 85°$ C. The fiber-containing mica film which has been sprinkled in this way is then cemented to the carrier material by means of a heatable calender under pressure and the action of heat.

The following can be used as the carrier material:
a) a glass fabric with a mass per unit area of 23 g/m$^2$ which is coated with 2 g/m$^2$ of a flexibly cross-linking acrylic resin which is temperature treated in an oven at 100° C. for curing, or
b) a polyester fabric with a mass per unit area of 20 g/m$^2$, or
c) a polyester film with a mass per unit area of 42 g/m$^2$.

The advantages of a mica-containing insulating tape produced using the process as claimed in the invention can be represented very effectively using the number of impregnated layers during vacuum pressure impregnation compared to known mica-containing insulating tapes.

For this reason profile rods are wound with 20 layers each of the mica-containing insulating tape half-overlapped, the end faces of the insulation are sealed with resin and the model rods which have been produced in this way and which simulate a winding element in the form of a conductor rod are impregnated with a solvent-free epoxy acid anhydride impregnation resin at 60° C. for three hours. After curing, the model rods are cut crosswise to be able to measure the impregnation depth.

In this way a mica-containing insulating tape produced using the process as claimed in the invention as shown in Example 1a) (sample A) or a known mica-containing insulating tape with a comparable structure, but without adding fibers (sample B), are used.

The results are shown in the diagrams in FIGS. 1 and 2.

The diagram in FIG. 1 shows that when using the mica-containing insulating tape A which has been produced by the invention the insulation thickness, i.e. the thickness of the 20 layers, is impregnated overall, while in known insulating tapes B without adding fibers only roughly two thirds of the insulation thickness is impregnated. This necessarily results in cavities between the individual layers which lead to partial discharges and thus to failure of the insulating system.

In another test, profile rods are wound with 10 layers each of mica-containing insulating tape half-overlapped, the end faces of the insulation are sealed with resin so that model rods which simulate a winding element in the form of a conductor bar are produced. Mica-containing insulating tapes can be a sample A which has been produced as shown in Example 1a of the process of the invention and a mica-containing insulating tape as in the prior art (sample B), but without the fiber added.

Then the cured model rods which have been provided with sample A or sample B are subjected to a thermal aging cycle, one cycle meaning the heating of the rods to 155° C. over 16 hours and subsequent cooling to room temperature. After each cycle the loss tangent value (tan $\delta$) is measured as a function of the voltage. The resulting maximum increase ($\Delta$tan$\delta$ max) reproduces the optical and mechanical state of the insulation after each cycle. Higher increase values mean earlier "rising" of the insulation which subsequently leads to electrical breakdown and thus to failure of the insulation.

In the diagram shown in FIG. 2 the number of thermal aging cycles is plotted against the maximum loss tangent increase (tan$\delta$ max in %).

This indicates that the mica-containing insulating tape without the addition of fibers (sample B) after a few aging cycles has a higher maximum loss tangent increase than sample A which is shown for comparison and which was produced using the process of the invention; this also makes it possible to draw conclusions about very rapid delamination of the insulation.

COMMERCIAL APPLICABILITY

Fiber-containing and mica-containing insulating tapes as are produced by the invention when used in the form of winding elements such as conductor rods show extremely satisfactory long-term behavior even after several thermal aging cycles, and an extremely low tendency to delamination.

I claim:

1. Process for producing mica-containing insulating tapes for windings of rotating high voltage electrical machinery which after winding under a vacuum and pressure can be impregnated with a solvent-free synthetic resin and then cured under the action of heat, characterized in that a fiber-containing mica film which in addition to fine mica also has organic and/or inorganic fibers admixed therewith is sprinkled with an epoxy resin mixture in the form of a powder enamel and that the side of the fiber-containing mica film which has been sprinkled with the powder enamel is cemented under pressure and at an elevated temperature to a carrier material, and wherein the proportion of fibers in the fiber-containing mica film is 3 to 50%.

2. Process as claimed in claim 1, wherein the carrier material consists of a glass or other fabric or a plastic film.

3. Process as claimed in claim 1, wherein the organic and/or inorganic fibers in the fiber-confining mica film have an average diameter from 0.1 to 20 microns.

4. Process as claimed in claim 1, wherein the organic and/or inorganic fibers in the fiber-confining mica film have an average length from 0.5 to 10 mm.

5. Process as claimed in claim 1, wherein the organic fibers are chosen from the group of aromatic polyamides or aromatic polyesters.

6. Process as claimed in claim 1, wherein the inorganic fibers are chosen from the group of E-glass, S-glass, silicon glass and aluminum.

7. Process as claimed in claim 1, wherein the fiber-containing mica film has a curing accelerator, which acts on the solvent-free synthetic resin.

8. Process as claimed in claim 1, wherein the powder enamel based on an epoxy resin mixture also contains a curing agent.

9. Process as claimed in claim 1, wherein the epoxy resin mixture which is used in the form of a powder enamel has a softening point of $\geqq 85°$ C.

10. A mica-containing insulating tape produced by the process of claim 1.

* * * * *